United States Patent [19]

Pole

[11] Patent Number: 4,652,199

[45] Date of Patent: Mar. 24, 1987

[54] DUST CANOPY

[75] Inventor: Charles D. Pole, Willowdale, Canada

[73] Assignee: ULS International Inc., Toronto, Canada

[21] Appl. No.: 638,200

[22] Filed: Aug. 6, 1984

[51] Int. Cl.$^4$ ............................................. B65G 69/18
[52] U.S. Cl. ..................................... 414/291; 141/97; 193/25 B; 198/560; 414/141; 414/292
[58] Field of Search ............... 414/139, 141, 291, 292; 141/93, 97, 388; 222/527, 529; 193/25 R, 25 B; 198/560

[56] References Cited

U.S. PATENT DOCUMENTS

| 464,530 | 12/1891 | States et al. ..................... 198/560 X |
| 946,969 | 1/1910 | Laing ................................. 193/25 R |
| 1,803,689 | 5/1931 | Bernadt ........................... 198/560 X |
| 4,248,277 | 2/1981 | Hanrot et al. ................... 414/291 X |
| 4,252,493 | 2/1981 | Ilse ..................................... 414/292 X |
| 4,444,290 | 4/1984 | Valerio ......................... 193/25 B X |

FOREIGN PATENT DOCUMENTS

| 542701 | 2/1977 | U.S.S.R. ............................... 198/560 |
| 742313 | 7/1980 | U.S.S.R. ............................... 414/291 |

Primary Examiner—Leslie J. Paperner
Attorney, Agent, or Firm—Bachman & LaPointe

[57] ABSTRACT

The off loading of bulk particulate cargo from self unloading ships creates considerable dust. A self erecting canopy arrangement is described which connects between a ship's boom and a dockside hopper and which can adjust to sudden movement of the boom created by the effect of wind and waves on the ship. The canopy comprises a pliant skirt and resilient, self supporting means such as an inflatable framework for supporting the skirt.

13 Claims, 7 Drawing Figures

FIG. 1.
FIG. 2.
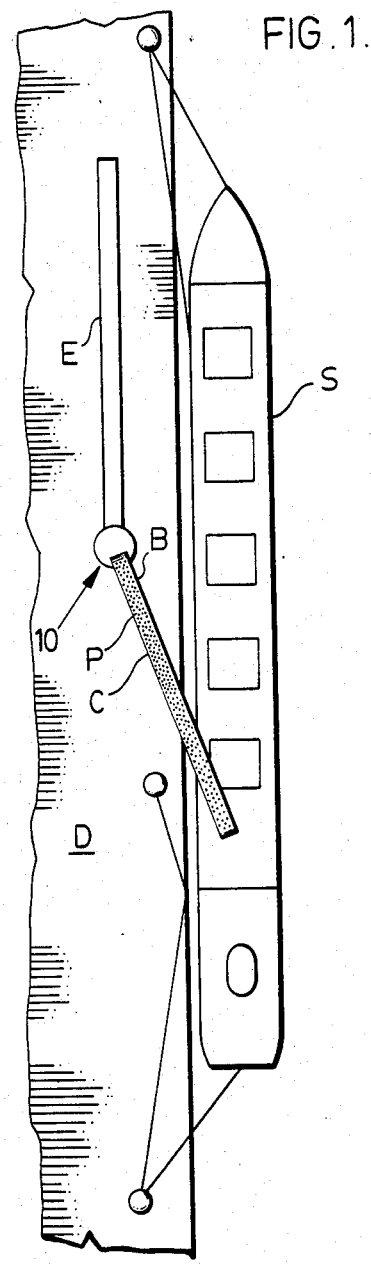
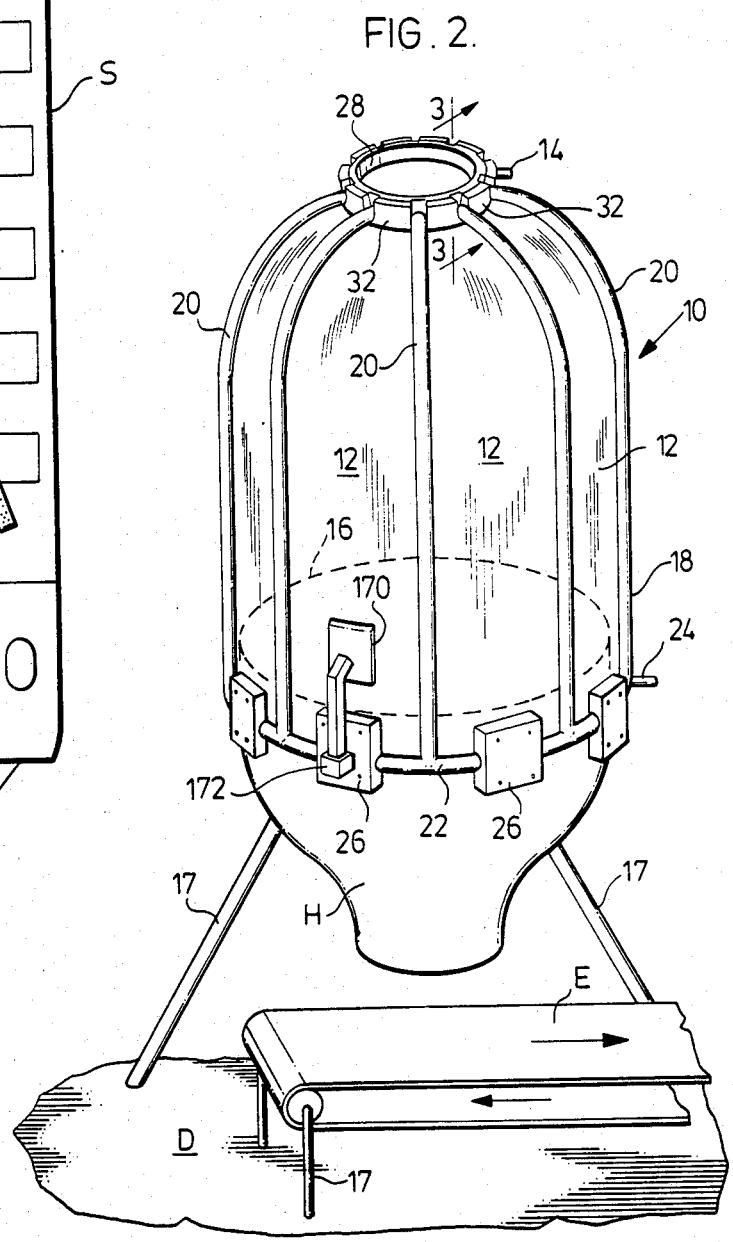

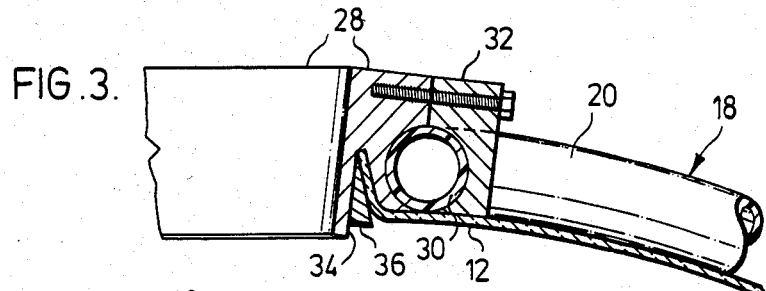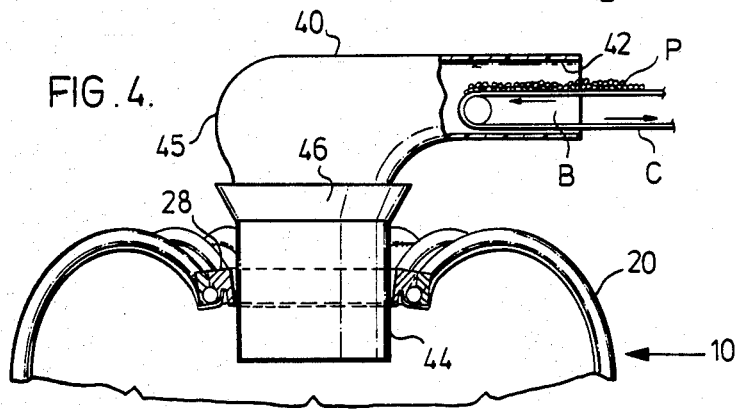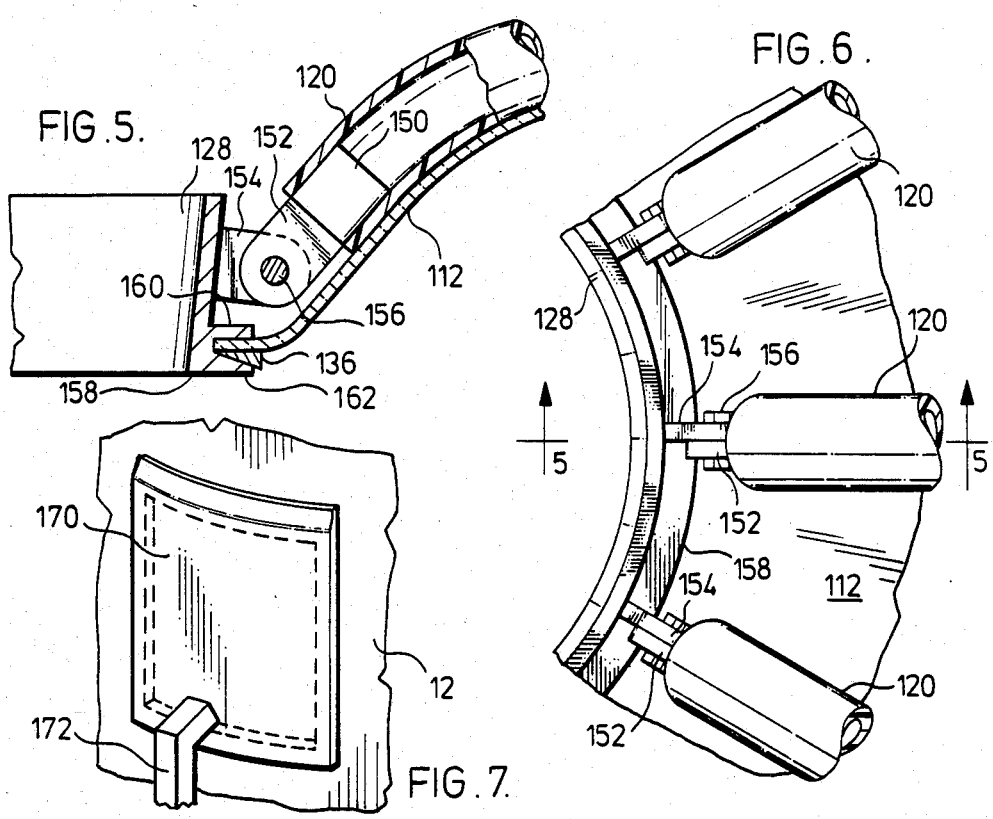

DUST CANOPY

FIELD OF INVENTION

This invention relates to apparatus for handling particulate material. It particularly relates to apparatus suited for use in the discharge of ships, especially self unloading ships, so as to reduce the escape of dust into the atmosphere.

BACKGROUND OF THE INVENTION

Hoppers are widely used on docks to receive material from the conveyor belts of self unloading vessels. Strict environmental laws and regulations dictate that dust created through the transfer of cargo from ship to shore must be controlled.

Self unloading vessels are generally fitted with an unloading boom of some 50 feet to 260 feet in length which swings out over the dock area. The end of this boom is positioned over a receiving hopper which guides the material flowing in its trajectory from the end of an endless belt conveyor to a second conveyor belt positioned under the shore based hopper.

Cargoes of particulate matter such as ore, coal, cement clinker, stone, grain, phosphate rock, gypsum, etc. create dust as they fall in their trajectory from the end of the ship's boom and strike the sides of the receiving hopper.

Various means have heretofore been proposed for controlling the escape of dust as particulate matter is discharged from a discharge chute therefor. In most instances, the discharge chute and the receptacle for the particulate matter are relatively static, or move in a predictable manner. In the discharge of cargo from a ship, there are predictable changes as the draft of the ship is reduced, but to these there must be superimposed unpredictable changes resulting from the variable effect of winds, tides and wave action on the ship.

In accordance with one proposal, a flexible pipe is used to connect between the boom end and the hopper. However, it is found that the abrasion and impact forces from the particulate matter severely limits the life of such pipe. Moreover, where such pipe is wire wound, there may be considerable hold up of particulate matter between the coils, which either results in contamination of a succeedingly discharged cargo, or necessitates a time consuming cleaning operation. Additionally, flexible pipes as have been heretofore proposed do not permit adequate movement of the discharge chute in vertical planes, as is required in connection with the unloading of ships.

In accordance with other proposals, canvas shrouds have been draped over the end of the boom, to surround the hopper, but this does not permit the requisite degree of movement between the boom and the hopper. Various types of hanging skirts have also been used to contain dust. They are usually hung from the end of the boom and surround the falling material in its path between boom end and hopper. A fine water spray is sometimes used in conjunction with this skirt but moisture content of many cargoes is critical and added water is not acceptable.

In accordance with still further proposals, the receiving hopper is sometimes constructed in such a manner as to form a box-like structure around the end of the boom, and is often fitted with suction devices to filter the dust laden air from the structure. Such hoppers are generally efficient, but require large capital investments. A danger exists however, due to the fact that such box-like structures are generally made of steel, and any unexpected movement of the boom may well result in damage to the boom or hopper or both.

It is then an object of the present invention to provide improved apparatus for containing dust. It is a further object of the invention to provide such apparatus which is suitable for use in the discharge of cargo from ships, particularly self unloading ships.

SUMMARY OF THE INVENTION

In accordance with one aspect of the invention, there is provided a dust canopy comprising a pliant skirt having an inlet opening at the upper end thereof, and resilient self supporting means for retaining the skirt erect as a substantially vertical wall enclosing a passage surrounding a stream of dusty material passing from an upper source to a lower destination. The wall flares out at the top, from the restricted inlet opening to a passage of cross-sectional area greater than that of the inlet opening so that the stream of material falling through the passage is spaced from the wall. Means is provided for securing the lower end of the skirt to the mouth of a receiving vessel.

Preferably, the resilient means comprises one or more inflatable elements, which form a frame for supporting the skirt, as a substantially vertical wall, and the frame is resilient in the axial and transaxial directions of the wall.

In accordance with an illustrative embodiment, the inflatable elements include a plurality of vertically alinged ribs. Such ribs locate on the outside of the skirt, where they are less exposed to damage from the discharge of the particulate matter.

Desirably the inflatable elements are interconnected in flow relationship, whereby the frame elements may be inflated simultaneously and uniformly. Expediently, where the frame comprises vertically aligned ribs, these are interconnected by one or more horizontally aligned connect the canopy to a hopper or other fixed structure.

Preferably the ribs will be constructed from relatively heavy walled tubing, whereby when they are placed under load, they will assume an arcuate form, and resist folding and creasing.

The skirt opening is provided with an entry chute for funneling particulate matter into the interior of the dust canopy. The entry chute is preferably secured to the canopy frame by load transfer means, which permits a hinging action between the frame and the entry chute. Desirably, the entry chute comprises a bearing member, which may suitably be in the form of a truncated conical collar, the bearing member being hingably secured to the canopy frame. The entry chute further comprises an entry tube portion having a circumscribing complimentary truncated conical collar, which seats and seals on the bearing member but which may be upwardly withdrawn therefrom.

In use, the lower end of the canopy is sealed about the mouth of a hopper, expediently by being secured directly thereto, and the frame is inflated to erect the canopy to its full height. The boom of a ship is attached to the entry chute and adjusted so that in its mean vertical position it will exert a force on the entry chute to depress the top wall of the canopy downwardly within he canopy, in re-entrant, heart like form. Upward movement of the boom will reduce the downward force on the canopy, permitting the top wall thereof to rise under the erecting force of the frame. A vertical rise of some 1.5 to 2 m. can be readily accommodated. In the event that the upward movement of the boom is greater than that designed for, the entry tube of the entry chute will release from the bearing collar secured to the frame. Other means may, of course, be provided for accommodating an excessive movement of the boom.

Desirably, the entry tube and bearing member will be constructed from a rigid material well able to resist the relative movement therebetween and the abrasive and impacting forces to which they are subject in normal use. Downward vertical movement of the boom will serve to depress the upper wall of the canopy still further into the interior thereof, causing the lower frame portions to undergo substantial angular movement, and for this reason the attachment of these lower frame portions to the hopper will desirably be such as to facilitate a hinging action. Lateral movement of the boom will cause the canopy to assume an asymmetric form, and will automatically tend to draw the top wall of the canopy downwardly whereby, in the event of a too violent lateral movement of the boom, the entry tube will become unseated from the bearing collar, to avoid exposure of the canopy to excessive tensile forces.

Having described the invention as to its brand aims, objects and advantages, illustrative embodiments thereof will be now described, in conjunction with the accompany drawings, and from which still further aims, objects and advantages will be perceived.

IN THE DRAWINGS

FIG. 1 shows in schematic plan view a self unloading ship and illustrates a field of use of the invention;

FIG. 2 shows in side elevation and schematic form a dust canopy in combination with a dock side hopper and conveyor installation;

FIG. 3 is a cross section on 3—3 of FIG. 2 on enlarged scale, and

FIG. 4 is an axial cross section of the dust canopy showing its use in conjunction with a ship's boom conveyor, also in schematic form, and shows the cowl partially lifted from the canopy for the sake of clarity.

FIG. 5 is similar to FIG. 3, but shows a different method of connecting the parts, and also assumes the canopy to be depressed as in FIG. 4;

FIG. 6 is a view along the arrow 6 of FIG. 5, and

FIG. 7 is a perspective view on enlarged scale of an overflow detector for the canopy.

Referring to the drawings in detail, a dust canopy in accordance with the ivention is denoted generally by the reference numeral 10. Referring particularly to FIG. 1, canopy 10 is shown therein in an illustrative field of use, that of discharging particulate matter P from a self unloading ship S which is moored at a dock D. Particulate matter P is conveyed from ship S by an endless conveyor belt C suspended from the ship's boom B.

Dust canopy 10 comprises a skirt 12 of pliable material which is selected for scuff resistance and its being generally imperveous to dust, and fabric materials coated with plasticized PVC or other elastomeric materials are here particularly suitable. Skirt 12 has an inlet opening 14 in the upper end thereof for receiving particulate matter P, the walls of the skirt flaring outwardly and downwardly from the inlet opening. This permits the particulate material P to fall relatively freely in the interior of skirt 12, without striking the side walls of the skirt. It also permits the deformation of the canopy in a manner that will be subsequently referred to.

The lower end of skirt 12 surrounds an inlet opening 16 of a hopper H, which inlet opening may also be referred to as the hopper mouth, into which the particulate material P falls, and from which it is discharged to a further conveyor belt E, the hopper H and conveyor E forming part of the dockside equipment and being normally statically located thereon by support struts 17.

Canopy 10 further comprises a plurality of resilient inflatable ribs 20 locating on the outer wall of skirt 12. While in this embodiment ribs 20 are constructed separately from the walls of skirt 12 and secured thereto by any convenient means, for example such as by being lashed thereto, adhered thereto or by the use of covering flaps sewn onto skirt 12, ribs 20 may also be integrated with the wall of skirt 12 so as to have common wall portions therewith, although this latter expedient is generally less preferred as it exposes the ribs to structural damage and perforation. When inflated, ribs 20 are self erecting and form a frame 18 to support skirt 12 in an upright position, with skirt inlet opening 14 being located vertically above and generally concentred on hopper mouth 16.

Ribs 20 of frame 18 are preferably vertically aligned, for maximum support of canopy 10; additional cross bracing of the frame may be included or be necessary, according to particular load factors and circumstances. Desirably, frame 18 also includes an annular horizontal connector 22 adjacent the base thereof, which serves as a manifold interconnecting the ribs 20 whereby the frame 18 may be uniformly and simultaneously inflated through a single inlet 24. It is to be here remarked that a plurality of inlets 24 is not precluded, however, even in those instances wherein the inflatable elements are fully interconnected in flow relationship. Connector 22 serves also to transfer loads to and from frame 18 of the canopy 10, and is anchored to hopper H about its mouth 16 thereof by clamps 26, the clamps further serving to seal skirt 12 about the base of the canopy to the wall of the hopper.

The opening 14 in the upper end of canopy 10 is lines by a bearing in the form of a collar 28. The interior facing wall of collar 28 is in the form of a truncated cone, the base of the cone being upwardly facing. Frame 18 comprises a second annular manifold connector 30, which interconnects the upper ends of ribs 20 in flow relationship. Collar 28 is clamped to connector 30 by a plurality of clamps 32, thereby serving to transfer loads between the collar 28 and frame 18. Collar 28 is provided with an annular slot 34 on the under edge thereof, into which skirt 12 is sealed and anchored by wedges 36.

The dust control apparatus further comprises a cowl 40 which provides a connection between boom B and the canopy 10 and the blow path for particulate material P into the canopy. Cowl 40 has an entry opening 42 in the horizontal plane, and which when the apparatus is in use surrounds the discharge end of conveyor C. Cowl 40 has a discharge tube 44 in the vertical plane, which passes through inlet opening 14 to the interior of canopy 10 to form part of the entry chute therefor. Intermediate portions 45 of cowl 40 connect between the entry opening 42 and the discharge tube 44. Discharge tube 44 is freely sliding within collar 28, and has a circumscribing mating collar 46 intermediate the ends thereof which seats and seals upon collar 28.

When frame 18 is inflated, canopy 10 will be erected and be of generally bell shaped form. In use, ship's boom B will be adjusted so as to bear on canopy 10, thereby depressing it downwardly, upper portions of canopy 10 thereby assuming a cycloidal cross section. This depression may typically be some 40 to 50 percent of the fully erected height of canopy 10, which may be some 3 to 4 m. The depression of upper portions of canopy 10 changes the angular relationship between the upper ends of ribs 20 and collar 28. This will in part be permitted by the resilient nature of the material forming ribs 18. However, clamps 32 should be such as to permit some rotational movement of connector 30 about its axis to provide a hinging action. In accordance with a second embodiment shown in FIGS. 6 and 7, mechanical hinging elements are employed to connect ribs 120 to collar 128 to transfer the load therebetween. Here, ribs 120 at their upper ends are sealed by plugs 150, from which plugs project planar ears. Other ears 154 are secured at spaced intervals to the outer wall of the collar 128, and hinge pins 156 interconnect pairs of ears 152 and 154. A horizontal flange 158 circumscribes collar 128 on the outer wall thereof beneath ears 154. Flange 158 has a pair of spaced apart jaws 160,162 into which skirt 112 is stuffed and secured by wedges 136. The lower ends of ribs 120 may be secured to a hopper mouth, or other fixed structure, by the use of similar mechanical hinging elements to those described above.

Ribs 20 will be moderately heavy walled, so as to resist creasing under load. Additionally the vertical ribs may be reinforced by diagonal ribs, or the whole frame structure constructed as a lattic work or other configuration as may be appropriate under the particular circumstance.

In calm waters, and where the wind is relatively constant, the movement of ship's boom B will be generally predictable and controllable, so as to maintain a constant position relative to hopper H, and canopy 10 therewith. Sudden movement of the boom in the vertical and horizontal planes within the design limits of the canopy will be followed closely by the resilient movement of the canopy in the vertical and horizontal planes permitted by resilient frame 18. Where the movement of ship's boom B is greater than is permitted by the design limits of canopy 10, the coupling between cowl 40 and canopy 10, at complimentary seating collars 28 and 46, will provide a quick release to permit cowl 40 to move relative to canopy 10, thereby avoiding catastrophic damage to the canopy.

The capacity of hopper H where it merely acts to funnel particulate matter P onto conveyor E is relatively limited, and in the event that the flow of particulate material from conveyor C is in excess of the flow capacity of hopper H, the particulate material will eventually overlfow from mouth 16 of the hopper. In the absence of dust canopy 10, an operator will perceive the build up of partiuclate matter in hopper H, and adjust the feed rate of particulate matter P delivered by conveyor C. This will not normally be possible when canopy 10 is positioned, as skirt 12 will normally be constructed of an opaque material.

Dust canopy 10 is not, of course, intended to act as a funnel for particulate material P, and any substantial overflow of particulate material from the mouth 16 of hopper H may well damage the dust canopy. For this reason I provide a means for determining overflow condition, one such means of rudimentary form being shown in FIG. 2 as comprising a flap 170 from which overflow particulate matter P may spill. The presence of overflowing particulate matter P may be determined visually, or alternatively a sensing means 172 is provided for determining an open flap condition. Desirably at least two flaps in different peripheral locations about the mouth 16 of hopper H are provided, and the sensing means 172 associated with each are serially connected, thereby avoiding the generation of spurious signals caused by the adventitious ejection of particulate matter P through flap 170. Flaps 170 may also function to relieve excess pressure build up within canopy 10.

It will be apparent that many modifications may be made to the foregoing illustrative embodiments while accompanying the aims and objects of the invention or certain ones thereof, and it is intended that all such modifications be encompassed within the claims appended hereto.

I claim:

1. In combination, a hopper having a mouth opening thereto,
   a skirt of pliant material,
   means for sealing said skirt adjacent its base about said hopper mouth,
   said skirt having a restricted inlet opening adjacent its upper end, and
   a flexible inflatable tubular frame which, when inflated, is self-supporting, for erecting said skirt to provide a substantially cylindrical wall with said inlet opening generally centered above said hopper mouth,
   an entry chute located in said inlet opening and supported from said frame by load transfer means, which permits a hinging action between said frame and said entry chute.

2. The conbination of claim 1, wherein said erecting means locates externally of said skirt.

3. The combination of claim 1, wherein members comprising said frame are vertically aligned.

4. The combination of claim 1, wherein said frame includes one or more interconnecting manifolds.

5. The combination of claim 1, wherein said frame includes an interconnecting annular manifold surrounding said inlet opening.

6. The combination of claim 1, further comprising an entry chute located in said inlet opening.

7. The combination of claim 1, further including means for sealing said canopy to said entry chute.

8. The combination of claim 1, wherein said load transfer means comprises hinge elements rigidly connected to said frame and said entry chute and hinge pins interconnecting said hinge elements.

9. The combination of claim 1, wherein said entry chute comprises a bearing to which said frame is secured by said load transfer means, and an entry tube portion seated on said bearing.

10. The combination of claim 9, wherein said bearing is in the form of a truncated cone, and wherein said entry tube portion is circumscribed by a complimentary turncated portion on which it seats on said bearing to provide a release coupling therebetween.

11. The combination of claim 9, wherein said entry tube forms part of a cowl.

12. The combination of claim 1, further comprising means for detecting an overflow condition in said hopper.

13. The combination of claim 12, wherein said means for detecting an overflow condition comprises a pair of detectors spaced apart about the mouth opening of said hopper, and serially connected.

* * * * *